(12) United States Patent
Li et al.

(10) Patent No.: US 9,431,892 B1
(45) Date of Patent: Aug. 30, 2016

(54) HIGH VOLTAGE START-UP CIRCUIT WITH ADJUSTABLE START-UP TIME

(71) Applicant: SUZHOU POWERON IC DESIGN CO., LTD., Suzhou, Jiangsu Province (CN)

(72) Inventors: Haisong Li, Jiangsu (CN); Changshen Zhao, Jiangsu (CN); Ping Tao, Jiangsu (CN); Yangbo Yi, Jiangsu (CN)

(73) Assignee: SUZHOU POWERON IC DESIGN CO., LTD, Suzhou (CN)

( * ) Notice: Subject to any disclaimer, the term of this patent is extended or adjusted under 35 U.S.C. 154(b) by 0 days.

(21) Appl. No.: 14/977,238

(22) Filed: Dec. 21, 2015

(30) Foreign Application Priority Data

Jul. 23, 2015 (CN) .......................... 2015 1 0437350

(51) Int. Cl.
- *H03K 3/02* (2006.01)
- *H02M 1/36* (2007.01)
- *H02M 3/158* (2006.01)

(52) U.S. Cl.
CPC ............... *H02M 1/36* (2013.01); *H02M 3/158* (2013.01)

(58) Field of Classification Search
CPC ....................................................... H02M 1/36
See application file for complete search history.

(56) References Cited

U.S. PATENT DOCUMENTS

2009/0206890 A1* 8/2009 Park .................... G11C 7/20
327/143

* cited by examiner

*Primary Examiner* — Daniel Puentes
(74) *Attorney, Agent, or Firm* — Howison & Arnott, LLP

(57) ABSTRACT

A high voltage start-up circuit with adjustable start-up time, wherein, the drain electrode of the first NMOS transistor is connected with a first terminal of the first resistor, a gate electrode of the second NMOS transistor and a negative terminal of the diode; a source electrode of the first NMOS transistor, together with a positive terminal of the diode, is connected to the power ground; a drain electrode of the second NMOS transistor, together with a second terminal of the first resistor, is connected with a port SW of a chip; a source electrode of the second NMOS transistor, together with a first terminal of the second resistor, is connected with a power port VDD of the chip. The circuit can adjust the start-up time and the restart time of the chip flexibly.

20 Claims, 3 Drawing Sheets

HIGH VOLTAGE START-UP CIRCUIT WITH ADJUSTABLE START-UP TIME

CROSS-REFERENCE TO RELATED APPLICATIONS

This application claims priority to and/or benefit from Chinese Application No. 201510437350.9, filed on Jul. 23, 2015, entitled "HIGH VOLTAGE START-UP CIRCUIT WITH ADJUSTABLE START-UP TIME," the specification of which is incorporated by reference herein in its entirety.

TECHNICAL FIELD

The present disclosure relates to a high voltage start-up circuit with adjustable start-up time, which is applicable to power management integrated chips, and belongs to the technical field of power semiconductors.

BACKGROUND

FIG. 1 shows the working waves of the traditional start-up mode of a start-up circuit. At the start time instant of the time span T1, the system is powered on and the start-up begins, then the VDD voltage continuously rises. At the end time instant of the time span T1, the VDD voltage reaches the threshold value VTH1, and the chip starts to work normally. The time span T2 is a normal working stage. When an abnormal event occurs at a certain time instant during the time span T2, the VDD voltage falls. When the VDD voltage falls to the threshold value VTH2, the under voltage latching signal UVLO is activated, and the chip goes into a restart stage of the time span T3. The VDD voltage rises and reaches the threshold value VTH1 again at the end time instant of the time span T3, and the chip starts to work normally and re-detects for any abnormal event. If the abnormal event still exists or any other abnormal event occurs, the restart process described above will be repeated until the time instant when the abnormal event is eliminated. After the successive restart process is over, the chip goes into the normal working stage of the time span T5.

The traditional start-up mode can ensure that the chip starts up normally and restarts when an abnormal event occurs, but in the traditional start-up mode, the power-on start-up time of the chip and the restart time of the chip are fixed and un-adjustable. What's more, the power-on start-up speed of the chip is identical to the restart speed of the chip. For example, when the power-on start-up is faster, the restart time will be shorter, thus resulting in larger input power during the restart and more power consumption. If the restart speed is lowered in order to decrease the power consumption during the restart, the power-on start-up speed will also be lowered, and may come to such a level that does not meet the application requirements.

SUMMARY

The present disclosure aims at overcoming the defects in the prior art, and providing a high voltage start-up circuit with adjustable start-up time, which effectively solves the contradiction between the power-on start-up and the restart. The present disclosure is capable of adjusting the power-on start-up time and the restart time of different chips according to application requirements, thereby realizing better application effects.

The objectives of the present disclosure are achieved by the following technical schemes:

According to one embodiment, a high voltage start-up circuit with adjustable start-up time includes a first NMOS transistor, a second NMOS transistor, a diode, a first resistor, a second resistor, a third resistor, a first comparator and a first counter; wherein the drain electrode of the first NMOS transistor is connected with a first terminal of the first resistor, the gate electrode of the second NMOS transistor and the negative terminal of the diode; the source electrode of the first NMOS transistor, together with the positive terminal of the diode, is connected to the power ground; the drain electrode of the second NMOS transistor, together with a second terminal of the first resistor, is connected with a port SW of a chip; the source electrode of the second NMOS transistor, together with a first terminal of the second resistor, is connected with a power port VDD of the chip; a second terminal of the second resistor is connected with a first terminal of the third resistor and a first input end of the first comparator; a second terminal of the third resistor is connected to the power ground; an output end of the first comparator is connected with an input end of the first counter; a first output end and a second output end of the first counter are respectively configured to be connected with a PWM controller; the first comparator is configured to detect voltage level of the power port VDD of the chip and generate a control signal Ctrl1; the first counter is configured to count the number of rising edges or falling edges of the control signal Ctrl1, and generate a first initial start-up enable signal to regulate the power-on start-up time of the chip and a first restart enable signal to regulate the restart time of the chip.

Further, controlled by an output signal of the first comparator, a second input end of the first comparator is configured to select either an input of a threshold value K×VTH1 or an input of a threshold value K×VTH2, wherein the input of the threshold value K×VTH1 and the input of the threshold value K×VTH2 are generated by the chip; ratio K is the voltage division ratio for the VDD voltage, which depends on a circuit structure constructed by the second resistor and the third resistor, wherein:

$$K = \frac{R_3}{R_2 + R_3};$$

VTH1 is a threshold value of the VDD voltage when the control signal Ctrl1 inverts to a high level, VTH2 is a threshold value of the VDD voltage when the control signal Ctrl1 inverts to a low level, wherein VTH1 is greater than VTH2; the threshold value VTH2 is greater than a threshold value of the VDD voltage set for an event of an internal power down of the chip; when the output signal of the first comparator is a high level, the second input end thereof selects the input of the threshold value K×VTH2; when the output signal of the first comparator is a low level, the second input end thereof selects the input of the threshold value K×VTH1.

Further, the control signal Ctrl1 controls the high voltage start-up circuit to work or stop working, thus causing a rise or a fall of the VDD voltage, thereby generating an inversion of the the control signal Ctrl1; type and number of the edges of the control signal Ctrl1, which are counted by the first counter, are configurable.

Further, for the power-on start-up, the type and number of the edges of the control signal Ctrl1 is configured to be falling edge and N1, wherein N1 can be any positive integer; for the restart, the type and number of the edges of the control signal Ctrl1, is configured to be falling edge and N2, wherein N2 can be any positive integer.

During the power-on start-up period, the high voltage start-up circuit works in the rise period from the VDD voltage to the threshold value VTH1, and stops working in the fall period from the threshold value VTH1 to the threshold value VTH2. After the control signal Ctrl1 has experienced N1 (N1 can be any positive integer) rising edges or falling edges, the first initial start-up enable signal is activated. After the VDD voltage reaches the threshold value VTH1 again and the chip's start-up is completed, the chip goes into the normal working stage. If an abnormal event occurs at any time instant thereafter, the high voltage start-up circuit shields the normal output of the chip. As the energy transmission is ceased, the VDD voltage begins to fall; when it falls to the threshold value VTH2, the control signal Ctrl1 is triggered to be active and the high voltage start-up circuit begins to work; after a period of time, the VDD voltage is charged up to the threshold value VTH1, and the high voltage start-up circuit stops working. At this time instant, as the normal output of the chip is still shielded, the VDD voltage begins to fall once again. The process mentioned above is repeated again and again. During this period of time, the first counter counts the number of the rising edges or the falling edges of the control signal Ctrl1. When the first counter counts up to N2 (N2 can be any positive integer), the first restart enable signal is activated. If the abnormal event has been eliminated at this time instant, after the VDD voltage is charged up to the threshold value VTH1, the restart process ends; if the abnormal event has not been eliminated yet, the VDD voltage begins to fall once again, and the chip goes into the restart stage; when the first counter counts up to N2, the first restart enable signal is activated again to make a judgment. The threshold value VTH2 is greater than the threshold value of VDD set for the event of the internal power down, so the internal power will never power down during the restart stage, and the internal circuit keeps its state all the time for performing the regular detection of the high voltage start-up circuit.

According to another embodiment, the high voltage start-up circuit further includes a second comparator, a second counter, a one-of-two data selector, and an OR gate; wherein a first input end of the second comparator is connected with the second terminal of the second resistor; an output end of the second comparator is connected with a second input end of the one-of-two data selector and an input end of the second counter; a first output end and a second output end of the second counter are respectively configured to be connected with the PWM controller; a first input end of the one-of-two data selector is connected with the output end of the first comparator; the selection terminal of the one-of-two data selector is connected with an output end of the OR gate; a first input end and a second input end of the OR gate are respectively connected with the first output end and the second output end of the first counter; the second comparator is configured to detect the voltage level of the power port VDD and generate a control signal Ctrl2, wherein the control signal Ctrl2 is an internal power signal or an indication signal of the internal power; the second counter is configured to count the number of rising edges or falling edges of the control signal Ctrl2, and generate a second initial start-up enable signal and a second restart enable signal.

Further, an output end of the one-of-two data selector is connected with the gate electrode of the first NMOS transistor.

Further, controlled by an output signal of the second comparator, a second input end of the second comparator is configured to select either an input of a threshold value K×VTH3 or an input of a threshold value K×VTH4, wherein the input of the threshold value K×VTH3 and the input of the threshold value K×VTH4 are generated by the chip; ratio K is the voltage division ratio for the VDD voltage, which depends on a circuit structure constructed by the second resistor and the third resistor, wherein:

$$K = \frac{R_3}{R_2 + R_3};$$

VTH3 is a threshold value of the VDD voltage when the control signal Ctrl2 inverts to a high level, namely, a threshold value of the VDD voltage when an internal power is set up, VTH4 is a threshold value of the VDD voltage when the control signal Ctrl2 inverts to a low level, namely, a threshold value of the VDD voltage when the internal power powers down, wherein VTH3 is greater than VTH4, and VTH1 is greater than VTH2, and VTH2 is greater than VTH4; when the output signal of the second comparator is a high level, the second input end of the second comparator selects the input of the threshold value K×VTH4; when the output signal of the second comparator is a low level, the second input end of the second comparator selects the input of the threshold value K×VTH3.

Further, the second comparator is configured to detect the voltage level of the power port VDD and generate a control signal Ctrl2, the first comparator is configured to detect the voltage level of the power port VDD and generate the control signal Ctrl1; the control signal Ctrl2 and the control signal Ctrl1 are selected to control the high voltage start-up circuit to work or stop working, thus causing a rise or a fall of the VDD voltage, thereby generating an inversion of the control signal Ctrl1 or the control signal Ctrl2; during a power-on start-up stage, if the first initial start-up enable signal is inactive, the control signal Ctrl1 controls the high voltage start-up circuit to work or not work; if the first initial start-up enable signal is active, the control signal Ctrl2 controls the high voltage start-up circuit to work or not work; during a restart stage, if the first restart enable signal is inactive, the control signal Ctrl1 controls the high voltage start-up circuit to work or not work; if the first restart enable signal is active, the control signal Ctrl2 controls the high voltage start-up circuit to work or not work.

Further, the type and number of the edges of the control signal Ctrl2, which are counted by the second counter, are configurable; for the power-on start-up, the type and number of the edges of the control signal Ctrl2 is configured to be a falling edge and N3, wherein N3 can be any positive integer; when the chip restarts after an abnormal event, the type and number of the edges of the control signal Ctrl2 is configured to be a falling edge and N4, wherein N4 can be any positive integer.

VTH3 is a threshold value of the VDD voltage when the internal power is set up, VTH4 is a threshold value of the VDD voltage when the internal power powers down. During the power-on start-up period, the VDD voltage continuously rises and reaches the threshold value VTH3, the control signal Ctrl2 inverts to a high level 1 and the internal power of the chip is set up. When the VDD voltage continuously rises and reaches the threshold value VTH1, the control signal Ctrl1 inverts to a high level 1 and the high voltage start-up circuit stops working. But at this time instant, controlled by the high voltage start-up circuit, the normal output of the chip is shielded, so the VDD voltage starts to fall. When the VDD voltage falls to the threshold value VTH2, the control signal Ctrl2 inverts to a low level 0; the high voltage start-up circuit starts to work; and the VDD voltage rises once again. The process mentioned above is repeated again and again. During this period, the first counter counts the number of the rising edges or the falling edges of the control signal Ctrl1. When the first counter counts up to N1 (N1 can be any positive integer), a signal is generated to choose the control signal Ctrl2 as the control signal controlling the high voltage start-up circuit to work again. When the VDD voltage falls to the threshold value VTH4, the internal power powers down; the control signal Ctrl2 inverts to a low level 0; the high voltage start-up circuit starts to work, and the VDD voltage rises once again. The whole process mentioned above is repeated again and again. During this period, the second counter counts the number of the rising edges or the falling edges of the control signal Ctrl2. When the second counter counts up to N3 (N3 can be any positive integer), the first and second initial start-up enable signal are active. When the VDD voltage rises to the threshold value VTH1, the power-on start-up stage is completed, and the chip goes into the normal working stage. If an abnormal condition occurs thereafter, the chip goes into the restart stage. When the VDD voltage falls to the threshold value VTH2, the control signal Ctrl1 inverts to a low level 0; the high voltage start-up circuit starts to work; and the VDD voltage rises again. The process is repeated again and again. During this period, the first counter counts the number of the rising edges or the falling edges of the control signal Ctrl1. When the first counter counts up to N2 (N2 can be any positive integer), a signal is generated to choose the control signal Ctrl2 as the control signal controlling the high voltage start-up circuit to work again. When the VDD voltage falls to the threshold value VTH4, the internal power powers down; the control signal Ctrl2 inverts to a low level 0; the high voltage start-up circuit starts to work, and the VDD voltage rises once again. This process is repeated again and again. During this period, the second counter counts the number of the rising edges or the falling edges of the control signal Ctrl2. When the second counter counts up to N4 (N4 can be any positive integer), the first and second restart enable signals are active. The restart enable signals start the judging for the current states of the internal circuit. If the abnormal event has been eliminated, after the VDD voltage reaches the threshold value VTH1, the restart process ends. The chip resumes normal working. If the abnormal event has not been eliminated, the restart process described above will be repeated until the abnormal event is eliminated at one time instant during a restart period, and the restart process of the chip ends.

The substantive features and notable progresses of the present disclosure are as follows:

1. With the high voltage start-up circuit with adjustable start-up time of the present disclosure, the power-on start-up time of the chip and the restart time of the chip can be adjusted flexibly, which effectively solves the contradiction between the power-on start-up and the restart. According to application requirements, different start-up times and restart times can be adjusted flexibly, thus achieving better application effects.
2. The high voltage start-up circuit can be used in self-powered high voltage applications, wherein, a self-powered circuit is included in the high voltage start-up circuit. The self-contained counter of the high voltage start-up circuit and the counter of the self-powered circuit count are implemented in a nested manner, thereby adjusting the start-up time and the restart time more flexibly, and obtaining better application effects.

BRIEF DESCRIPTION OF THE DRAWINGS

For a more complete understanding, reference is now made to the following description taken in conjunction with the accompanying Drawings in which.

DETAILED DESCRIPTION

The present disclosure will now be described in more detail with reference to the accompanying figures and embodiments.

The present disclosure provides a high voltage start-up circuit with adjustable start-up time, which is capable of flexibly adjusting the power-on start-up time of the chip and the restart time of the chip, so as to meet different application requirements.

Figure 1:
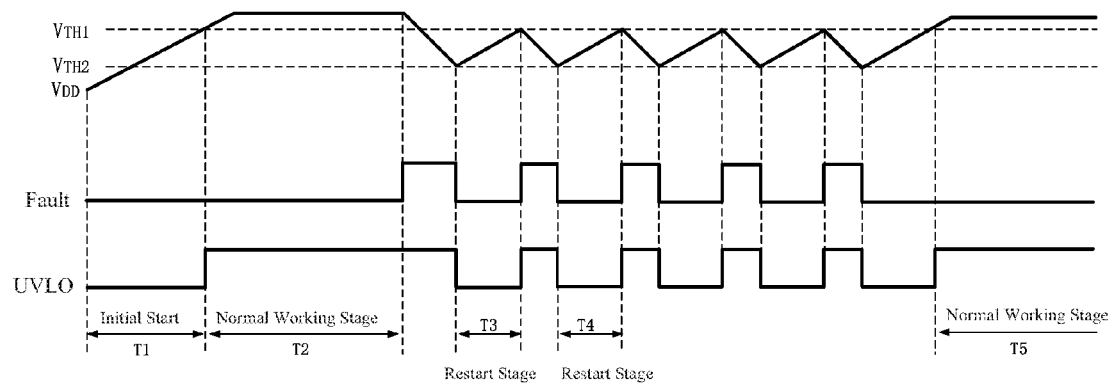
FIG. 1 is a schematic diagram illustrating working waves of the traditional start-up circuit.
Figure 2:
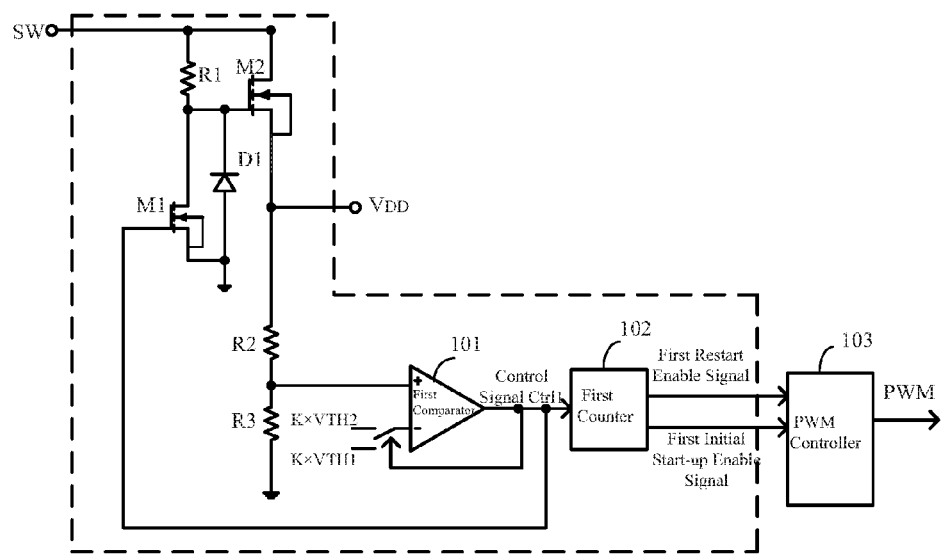
FIG. 2 is a schematic diagram illustrating the high voltage start-up circuit with adjustable start-up time according to one embodiment of the present invention.

As shown in FIG. 2, the high voltage start-up circuit with adjustable start-up time includes a first NMOS transistor M1, a second NMOS transistor M2, a diode D1, a first resistor R1, a second resistor R2, a third resistor R3, a first comparator 101 and a first counter 102. The drain electrode of the first NMOS transistor M1 is connected with a first terminal of the first resistor R1, the gate electrode of the second NMOS transistor M2 and the negative terminal of the diode D1. The gate electrode of the first NMOS transistor M1 is connected with the output end of the first comparator 101 and the input end of the first counter 102. The source electrode of the first NMOS transistor M1, together with the positive terminal of the diode D1, is connected to the power ground. The drain electrode of the second NMOS transistor M2, together with a second terminal of the first resistor R1, is connected with the port SW of the chip. The source electrode of the second NMOS transistor M2, together with the first terminal of the second resistor R2, is connected with the power port VDD of the chip. The second terminal of the second resistor R2 is connected with the first terminal of the third resistor R3 and the first input end of the first comparator 101. The second terminal of the third resistor R3 is connected to the power ground. The output end of the first comparator 101 is connected with the input end of the first counter 102. The first output end and the second output end of the first counter 102 are respectively connected with a PWM controller 103, which is not included in the high voltage start-up circuit and is built in the application chip. The first comparator 101 detects the voltage level of the power port VDD of the chip and generates a control signal Ctrl1. The first counter 102 counts the number of the rising edges or falling edges of the control signal Ctrl1 and generates a first initial start-up enable signal to regulate the power-on start-up time of the chip and a first restart enable signal to regulate the restart time of the chip.

Controlled by the output signal from the output end of the first comparator 101, the second input end of the first comparator 101 selects either an input of the threshold value K×VTH1 or an input of the threshold value K×VTH2, wherein the input of the threshold value K×VTH1 and the input of the threshold value K×VTH2 are generated by the chip. K is the voltage division ratio for the VDD voltage, which depends on the circuit structure constructed by the second resistor R2 and the third resistor R3, wherein:

$$K = \frac{R_3}{R_2 + R_3}.$$

VTH1 is a threshold value of the VDD voltage when the control signal Ctrl1 inverts to a high level, VTH2 is the threshold value of the VDD voltage when the control signal Ctrl1 inverts to a low level, wherein VTH1 is greater than VTH2, and VTH2 is greater than the threshold value of the VDD voltage set for the event of the internal power down of the chip. When the output signal of the first comparator 101 is a high level, the second input end of the first comparator 101 selects the input of the threshold value K×VTH2; when the output signal of the first comparator 101 is a low level, the second input end of the first comparator 101 selects the input of the threshold value K×VTH1.

The control signal Ctrl1 controls the high voltage start-up circuit to work or stop working, thus causing a rise or a fall of the VDD voltage, thereby generating an inversion of the the control signal Ctrl1. The type and the number of the edges of the control signal Ctrl1, which are counted by the first counter 102, are configurable. For a power-on start-up, the type and number of the edges of the control signal Ctrl1 is configured to be a falling edge and N1, wherein N1 can be any positive integer; for a restart, the type and number of the edges of the control signal Ctrl1 is configured to be a falling edge and N2, wherein N2 can be any positive integer.

Figure 3:
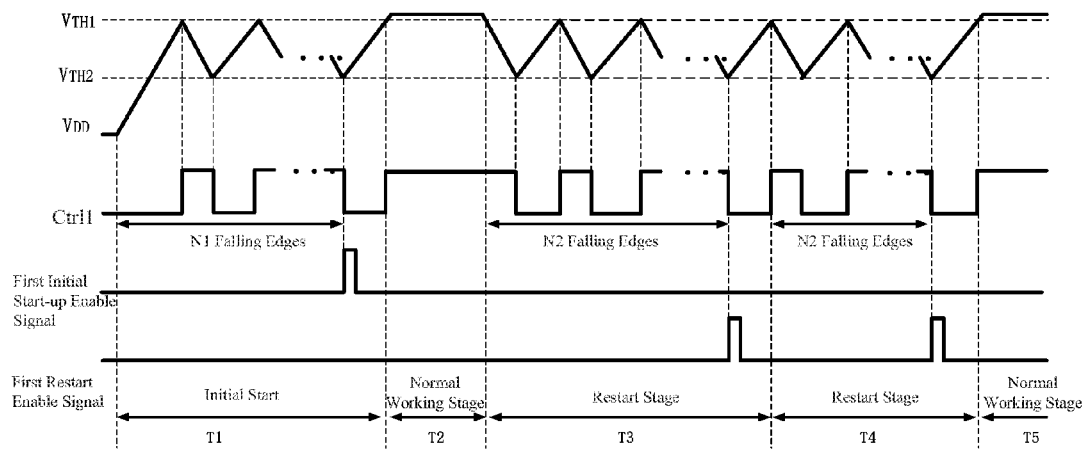
FIG. 3 is a schematic diagram illustrating working waves of the high voltage start-up circuit of FIG. 2.

FIG. 3 shows the working waves of the above mentioned high voltage start-up circuit with adjustable start-up time. During the time span T1, the chip is powered on and started up, the high voltage start-up circuit works in the rise period from the VDD voltage to the threshold value VTH1, and stops working in the fall period from the threshold value VTH1 to the threshold value VTH2. After the control signal Ctrl1 has experienced N1 rising edges or falling edges (what is shown in the working waves are falling edges, and N1 is a positive integer), the first initial start-up enable signal is activated. The start-up of the chip is completed at the end time instant of the time span T1, and, at this time instant, the VDD voltage reaches the threshold value VTH1. Thereafter the chip goes into the normal working stage of the time span T2. If an abnormal event occurs at any time instant thereafter, the high voltage start-up circuit shields the normal output of the chip. As the energy transmission is ceased, the VDD voltage begins to fall; when it falls to the threshold value VTH2, the control signal Ctrl1 is triggered to be active and the high voltage start-up circuit begins to work; after a period of time, the VDD voltage is charged up to the threshold value VTH1, and the high voltage start-up circuit stops working. At this time instant, as the normal output of the chip is still shielded, the VDD voltage begins to fall once again. The process mentioned above is repeated again and again until the end time instant of the time span T3. During the time span T3, the first counter counts the number of the rising edges or the falling edges (what is shown in the working waves are falling edges) of the control signal Ctrl1.

When the first counter counts up to N2, the first restart enable signal is activated. If the abnormal event has not been eliminated yet, the VDD voltage begins to fall once again, and the chip goes into a restart stage again. When the first counter counts up to N2, the first restart enable signal is activated again. If the abnormal event has been eliminated at this time instant, after the VDD voltage is charged up to the threshold value VTH1, the restart process ends, as shown in the time span T4. Then the chip goes into the normal working stage of the time span T5. The threshold value VTH2 is greater than the threshold value of VDD set for the internal power down, so the internal power will never power down during the restart stage, and the internal circuit keeps its state all the time for performing the regular detection of the high voltage start-up circuit.

Figure 4:
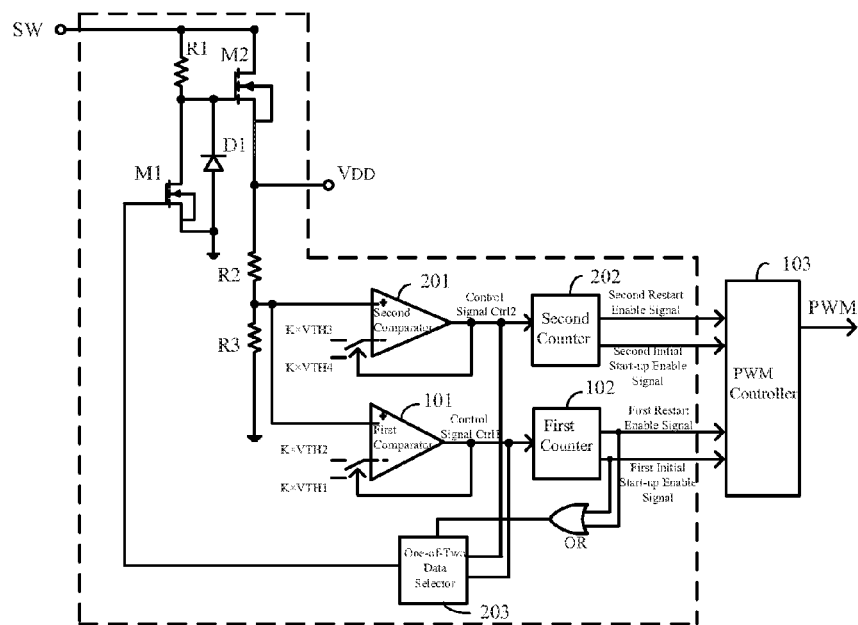
FIG. 4 is a schematic diagram illustrating the high voltage start-up circuit with adjustable start-up time according to another embodiment of the present invention.

As shown in FIG. 4, based on the circuit of FIG. 2, the high voltage start-up circuit with adjustable start-up time further includes a second comparator 201, a second counter 202, a one-of-two data selector 203, and an OR gate. A first input end of the second comparator 201 is connected with the second terminal of the second resistor R2. The output end of the second comparator 201 is connected with the second input end of the one-of-two data selector 203 and the input end of the second counter 202. The first output end and the second output end of the second counter 202 are respectively connected with the PWM controller 103. The first input end of the one-of-two data selector 203 is connected with the output end of the first comparator 201. The selection terminal Sel of the one-of-two data selector 203 is connected with the output end of the OR gate. The first input end and the second input end of the OR gate are respectively connected with the first output end and the second output end of the first counter 102. The output end of the one-of-two data selector 203 is connected with the gate electrode of the first NMOS transistor M1. The second comparator 201 detects the voltage level of the power port VDD and generates a control signal Ctrl2. The control signal Ctrl2 is an internal power signal or an indication signal of the internal power. The second counter 202 counts the number of the rising edges or the falling edges of the control signal Ctrl2, and generates a second initial start-up enable signal and a second restart enable signal. The high voltage start-up circuit makes use of the two sets of enable signals in a nested manner, so that the high voltage start-up circuit is able to adjust the power-on start-up time of the chip and the restart time of the chip more precisely.

Controlled by the output signal from the output end of the second comparator 201, the second input end of the second comparator 201 selects either an input of the threshold value K×VTH3 or an input of the threshold value K×VTH4, wherein the input of the threshold value K×VTH3 and the input of the threshold value K×VTH4 are generated by the chip. Ratio K is the voltage division ratio for the VDD voltage, which depends on the circuit structure constructed by the second resistor R2 and the third resistor R3, wherein:

$$K = \frac{R_3}{R_2 + R_3}.$$

The threshold value VTH3 is the threshold value of the VDD voltage when the control signal Ctrl2 inverts to a high level, namely, the threshold value of the VDD voltage when the internal power is set up. The threshold value VTH4 is the threshold value of the VDD voltage when the control signal Ctrl2 inverts to a low level, namely, the threshold value of the VDD voltage when the internal power powers down, wherein VTH3 is greater than VTH4, VTH1 is greater than VTH2, and VTH2 is greater than VTH4. The threshold value VTH1 is the threshold value of the VDD voltage when the control signal Ctrl1 inverts to a high level. The threshold value VTH2 is the threshold value of the VDD voltage when the control signal Ctrl1 inverts to a low level. When the output signal of the second comparator 201 is a high level, the second input end of the second comparator 201 selects the input of the threshold value K×VTH4; when the output signal of the second comparator 201 is a low level, the second input end of the second comparator 201 selects the input of the threshold value K×VTH3.

The second comparator 201 detects the voltage level of the power port VDD and generates a control signal Ctrl2, the first comparator 101 detects the voltage level of the power port VDD and generates a control signal Ctrl1. The control signal Ctrl2 and the control signal Ctrl1 are selected to control the high voltage start-up circuit to work or stop working, thus causing a rise or a fall of the VDD voltage, thereby generating an inversion of the control signal Ctrl1 or the control signal Ctrl2. During the power-on start-up stage, if the first initial start-up enable signal is inactive, the control signal Ctrl1 controls the high voltage start-up circuit to work or not work; if the first initial start-up enable signal is active, the control signal Ctrl2 controls the high voltage start-up circuit to work or not work. During the restart stage, if the first restart enable signal is inactive, the control signal Ctrl1 controls the high voltage start-up circuit to work or not work; if the first restart enable signal is active, the control signal Ctrl2 controls the high voltage start-up circuit to work or not work. The type and the number of the edges of the control signal Ctrl2, which are counted by the second counter 202, are configurable. For the power-on start-up, the type and number of the edges of the control signal Ctrl2 are configured to be a falling edge and N3, wherein N3 can be any positive integer; when the chip restarts after an abnormal event, the type and number of the edges of the control signal Ctrl2 are configured to be a falling edge and N4, wherein N4 can be any positive integer.

Figure 5:
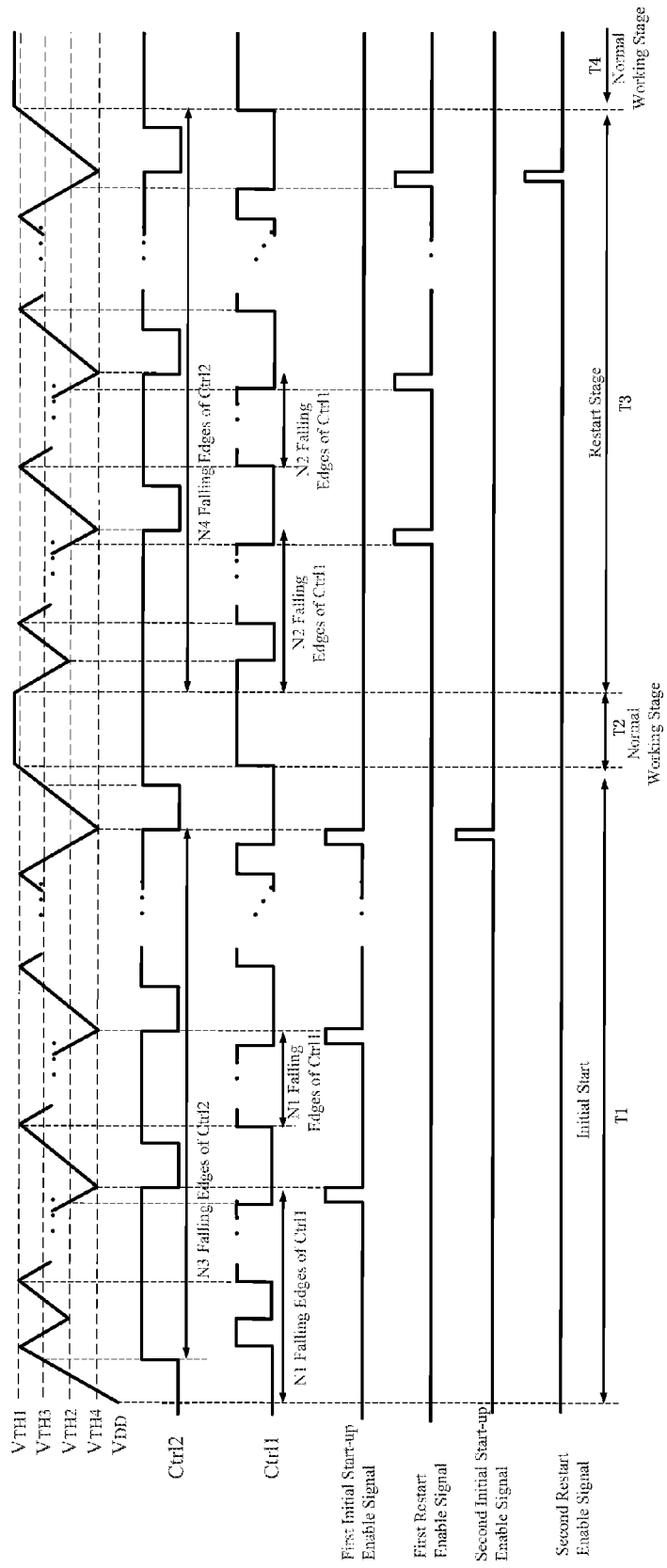
FIG. 5 is a schematic diagram illustrating working waves of the high voltage start-up circuit of FIG. 4.

FIG. 5 shows the working waves of the high voltage start-up circuit of FIG. 4. During the time span T1, the chip is powered on and started up. When the VDD voltage continuously rises and reaches the threshold value VTH3, the control signal Ctrl2 inverts to a high level 1 and the internal power of the chip is set up. When the VDD voltage continuously rises and reaches the threshold value VTH1, the control signal Ctrl1 inverts to a high level 1 and the high voltage start-up circuit stops working. But at this time instant, controlled by the high voltage start-up circuit, the normal output of the chip is shielded, so the VDD voltage starts to fall. When the VDD voltage falls to the threshold value VTH2, the control signal Ctrl2 inverts to a low level 0; the high voltage start-up circuit starts to work; and the VDD voltage rises once again. The process mentioned above is repeated again and again. During this period, the first counter counts the number of the rising edges or the falling edges (what is shown in the working waves are falling edges) of the control signal Ctrl1. When the first counter counts up to N1 (N1 can be any positive integer), a signal is generated to choose the control signal Ctrl2 as the control signal controlling the high voltage start-up circuit to work again. When the VDD voltage falls to the threshold value VTH4, the internal power powers down; the control signal Ctrl2 inverts to a low level 0; the high voltage start-up circuit starts to work, and the VDD voltage rises once again. The whole process mentioned above is repeated again and again. During this period, the second counter counts the number of the rising edges or the falling edges of the control signal Ctrl2. When the second counter counts up to N3 (N3 can be any positive integer), the first and second initial start-up enable signal are activated. When the VDD voltage rises to the threshold value VTH1, the power-on start-up stage is completed, and the chip goes into the normal working stage of the time span T2. If an abnormal condition occurs thereafter, the chip goes into the restart stage of the time span T3. The VDD voltage falls; when the VDD voltage falls to the threshold value VTH2, the control signal Ctrl1 inverts to a low level 0; the high voltage start-up circuit starts to work; and the VDD voltage rises again. The process is repeated again and again. During this period, the first counter counts the number of the rising edges or the falling edges of the control signal Ctrl1. When the first counter counts up to N2 (N2 can be any positive integer), a signal is generated to choose the control signal Ctrl2 as the control signal controlling the high voltage start-up circuit to work again. When the VDD voltage falls to the threshold value VTH4, the internal power powers down; the control signal Ctrl2 inverts to a low level 0; the high voltage start-up circuit starts to work, and the VDD voltage rises once again. This process is repeated again and again. During this period, the second counter counts the number of the rising edges or the falling edges of the control signal Ctrl2. When the second counter counts up to N4 (N4 can be any positive integer), the first and second restart enable signals are active. The restart enable signals start the judging for the current states of the internal circuit. If the abnormal event has been eliminated, after the VDD voltage reaches the threshold value VTH1, the restart process ends. The restart of the chip is completed and the chip resumes normal working in the time span T4.

The high voltage start-up circuit with adjustable start-up time of the present disclosure could flexibly adjust the power-on start-up time of the chip and the restart time of the chip, and effectively solve the contradiction between the power-on start-up and the restart. According to application requirements, the present disclosure is capable of adjusting the start-up time and the restart time flexibly, thus realizing better application effects.

It should be understood by those skilled in the art that the present invention is not restricted to the preferred embodiments, and that various modifications or improvement may be made based on the principles of the present invention without departing from the scope of the present invention.

What is claimed is:

1. A high voltage start-up circuit with adjustable start-up time, comprising:
  a drain electrode of a first NMOS transistor connected with a first terminal of a first resistor, a gate electrode of a second NMOS transistor, and a negative terminal of a diode;
  a source electrode of the first NMOS transistor, together with a positive terminal of the diode, connected to a power ground;
  a drain electrode of the second NMOS transistor, together with a second terminal of the first resistor, connected with a port SW of a chip;
  a source electrode of the second NMOS transistor, together with a first terminal of a second resistor, connected with a power port VDD of the chip, the power port VDD operable to generate a VDD voltage;
  a second terminal of the second resistor connected with a first terminal of a third resistor and a first input end of a first comparator;

a second terminal of the third resistor connected to a power ground;
an output end of the first comparator connected with an input end of a first counter; and
a first output end and a second output end of the first counter respectively configured to be connected with a PWM controller,
wherein
the first comparator is configured to detect a voltage level of the power port VDD of the chip and to generate a control signal Ctrl1, and
the first counter is configured to count a number of rising edges or falling edges of the control signal Ctrl1, and to generate a first initial start-up enable signal to regulate power-on start-up time of the chip and a first restart enable signal to regulate restart time of the chip.

2. The high voltage start-up circuit with adjustable start-up time of claim 1, wherein
a second input end of the first comparator is controlled by an output signal from the output end of the first comparator, and the second input end is configured to select either an input of a threshold value K×VTH1 or an input of a threshold value K×VTH2, wherein the input of the threshold value K×VTH1 and the input of a threshold value K×VTH2 are generated by the chip,
ratio K is the voltage division ratio for the VDD voltage, which depends on a circuit structure constructed by the second resistor and the third resistor, wherein $$K = \frac{R_3}{R_2 + R_3},$$

VTH1 is a threshold value of the VDD voltage when the control signal Ctrl1 inverts to a high level, VTH2 is a threshold value of the VDD voltage when the control signal Ctrl1 inverts to a low level, wherein VTH1 is greater than VTH2,
when the output signal of the first comparator is a high level, the second input end thereof selects the input of the threshold value K×VTH2, and
when the output signal of the first comparator is a low level, the second input end thereof selects the input of the threshold value K×VTH1.

3. The high voltage start-up circuit with adjustable start-up time of claim 2, wherein the threshold value VTH2 is greater than a threshold value of the VDD voltage set for an internal power down event of the chip.

4. The high voltage start-up circuit with adjustable start-up time of claim 1, wherein the control signal Ctrl1 controls the high voltage start-up circuit to work or stop working, thus causing a rise or a fall of the VDD voltage, thereby generating an inversion of the control signal Ctrl1, wherein the type and the number of the edges of the control signal Ctrl1, which are counted by the first counter, are configurable.

5. The high voltage start-up circuit with adjustable start-up time of claim 4, wherein, for the power-on start-up, the type and number of the edges of the control signal Ctrl1 are configured to be a falling edge and N1, wherein N1 can be any positive integer, and wherein for the restart, the type and number of the edges of the control signal Ctrl1 are configured to be a falling edge and N2, wherein N2 can be any positive integer.

6. The high voltage start-up circuit with adjustable start-up time of claim 1, further comprising:
a first input end of a second comparator connected with the second terminal of the second resistor;
an output end of the second comparator connected with a second input end of a one-of-two data selector and an input end of a second counter;
a first output end and a second output end of the second counter respectively configured to be connected with the PWM controller;
a first input end of the one-of-two data selector connected with the output end of the first comparator;
a selection terminal of the one-of-two data selector connected with an output end of an OR gate; and
a first input end and a second input end of the OR gate respectively connected with the first output end and the second output end of the first counter,
wherein the second comparator is configured to detect the voltage level of the power port VDD and generate a control signal Ctrl2, the control signal Ctrl2 is an internal power signal or an indication signal of the internal power, and the second counter is configured to count the number of rising edges or falling edges of the control signal Ctrl2 and to generate a second initial start-up enable signal and a second restart enable signal.

7. The high voltage start-up circuit with adjustable start-up time of claim 6, wherein an output end of the one-of-two data selector is connected with a gate electrode of the first NMOS transistor.

8. The high voltage start-up circuit with adjustable start-up time of claim 6, wherein
a second input end of the second comparator is controlled by an output signal from the output end of the second comparator and the second input end is configured to select either an input of a threshold value K×VTH3 or an input of a threshold value K×VTH4, wherein the input of the threshold value K×VTH3 and the input of a threshold value K×VTH4 are generated by the chip,
ratio K is the voltage division ratio for the VDD voltage, which depends on a circuit structure constructed by the second resistor and the third resistor, wherein $$K = \frac{R_3}{R_2 + R_3},$$

VTH3 is a threshold value of the VDD voltage when the control signal Ctrl2 inverts to a high level, namely, a threshold value of the VDD voltage when an internal power is set up,
VTH4 is a threshold value of the VDD voltage when the control signal Ctrl2 inverts to a low level, namely, a threshold value of the VDD voltage when the internal power powers down, wherein, VTH3 is greater than VTH4, and VTH1 is greater than VTH2, and VTH2 is greater than VTH4,
when the output signal of the second comparator is a high level, the second input end of the second comparator selects the input of the threshold value K×VTH4, and
when the output signal of the second comparator is a low level, the second input end of the second comparator selects the input of the threshold value K×VTH3.

9. The high voltage start-up circuit with adjustable start-up time of claim 6, wherein the second comparator is configured to detect the voltage level of the power port VDD and generate a control signal Ctrl2, the first comparator is configured to detect the voltage level of the power port VDD and generate the control signal Ctrl1, the control signal Ctrl2 and the control signal Ctrl1 are selected to control the high voltage start-up circuit to work or stop working, thus causing a rise or a fall of the VDD voltage, thereby generating an inversion of the control signal Ctrl1 or the control signal Ctrl2, during a power-on start-up stage, if the first initial enable signal is inactive, the control signal Ctrl1 controls the high voltage start-up circuit to work or not work, if the first initial enable signal is active, the control signal Ctrl2 controls the high voltage start-up circuit to work or not work, during a restart stage, if the first restart enable signal is inactive, the control signal Ctrl1 controls the high voltage start-up circuit to work or not work, and if the first restart enable signal is active, the control signal Ctrl2 controls the high voltage start-up circuit to work or not work.

10. The high voltage start-up circuit with adjustable start-up time of claim 9, wherein the type and the number of the edges of the control signal Ctrl2, which are counted by the second counter, are configurable, for the power-on start-up, the number of the falling edges of the control signal Ctrl2 is configured to be N3, wherein N3 can be any positive integer, and when the chip restarts after an abnormal event, the number of the falling edges of the control signal Ctrl2 is configured to be N4, wherein N4 can be any positive integer.

11. A high voltage start-up circuit with adjustable start-up time, comprising:
  a drain electrode of a first NMOS transistor connected with a first terminal of a first resistor, a gate electrode of a second NMOS transistor, and a negative terminal of a diode;
  a source electrode of the first NMOS transistor, together with a positive terminal of the diode, connected to a power ground;
  a drain electrode of the second NMOS transistor, together with a second terminal of the first resistor, connected with a port SW of a chip;
  a source electrode of the second NMOS transistor, together with a first terminal of a second resistor, connected with a power port VDD of the chip, the power port VDD operable to generate a VDD voltage;
  a second terminal of the second resistor connected with a first terminal of a third resistor and a first input end of a first comparator;
  a second terminal of the third resistor connected to a power ground;
  an output end of the first comparator connected with an input end of a first counter;
  a first output end and a second output end of the first counter respectively configured to be connected with a PWM controller;
  a first input end of a second comparator connected with the second terminal of the second resistor;
  an output end of the second comparator connected with a second input end of a one-of-two data selector and an input end of a second counter;
  a first output end and a second output end of the second counter respectively configured to be connected with the PWM controller;
  a first input end of the one-of-two data selector connected with the output end of the first comparator;
  a selection terminal of the one-of-two data selector connected with an output end of an OR gate; and
  a first input end and a second input end of the OR gate respectively connected with the first output end and the second output end of the first counter, wherein
  the first comparator is configured to detect a voltage level of the power port VDD of the chip and to generate a control signal Ctrl1,
  the first counter is configured to count a number of rising edges or falling edges of the control signal Ctrl1, and to generate a first initial start-up enable signal to regulate power-on start-up time of the chip and a first restart enable signal to regulate restart time of the chip,
  the second comparator is configured to detect the voltage level of the power port VDD and generate a control signal Ctrl2,
  the control signal Ctrl2 is an internal power signal or an indication signal of the internal power, and
  the second counter is configured to count the number of rising edges or falling edges of the control signal Ctrl2 and to generate a second initial start-up enable signal and a second restart enable signal.

12. The high voltage start-up circuit with adjustable start-up time of claim 11, wherein
  a second input end of the first comparator is controlled by an output signal from the output end of the first comparator, and the second input end is configured to select either an input of a threshold value K×VTH1 or an input of a threshold value K×VTH2, wherein the input of the threshold value K×VTH1 and the input of a threshold value K×VTH2 are generated by the chip, ratio K is the voltage division ratio for the VDD voltage, which depends on a circuit structure constructed by the second resistor and the third resistor, wherein $$K = \frac{R_3}{R_2 + R_3},$$

VTH1 is a threshold value of the VDD voltage when the control signal Ctrl1 inverts to a high level, VTH2 is a threshold value of the VDD voltage when the control signal Ctrl1 inverts to a low level, wherein VTH1 is greater than VTH2,
  when the output signal of the first comparator is a high level, the second input end thereof selects the input of the threshold value K×VTH2, and
  when the output signal of the first comparator is a low level, the second input end thereof selects the input of the threshold value K×VTH1.

13. The high voltage start-up circuit with adjustable start-up time of claim 12, wherein the threshold value VTH2 is greater than a threshold value of the VDD voltage set for an internal power down event of the chip.

14. The high voltage start-up circuit with adjustable start-up time of claim 11, wherein the control signal Ctrl1 controls the high voltage start-up circuit to work or stop working, thus causing a rise or a fall of the VDD voltage, thereby generating an inversion of the control signal Ctrl1, wherein the type and the number of the edges of the control signal Ctrl1, which are counted by the first counter, are configurable.

15. The high voltage start-up circuit with adjustable start-up time of claim 14, wherein, for the power-on start-up, the type and number of the edges of the control signal Ctrl1 are configured to be a falling edge and N1, wherein N1 can be any positive integer, and wherein for the restart, the type and number of the edges of the control signal Ctrl1 are configured to be a falling edge and N2, wherein N2 can be any positive integer.

16. The high voltage start-up circuit with adjustable start-up time of claim 11, wherein an output end of the one-of-two data selector is connected with a gate electrode of the first NMOS transistor.

17. The high voltage start-up circuit with adjustable start-up time of claim 11, wherein
a second input end of the second comparator is controlled by an output signal from the output end of the second comparator and the second input end is configured to select either an input of a threshold value K×VTH3 or an input of a threshold value K×VTH4, wherein the input of the threshold value K×VTH3 and the input of a threshold value K×VTH4 are generated by the chip,
ratio K is the voltage division ratio for the voltage VDD, which depends on a circuit structure constructed by the second resistor and the third resistor, wherein $$K = \frac{R_3}{R_2 + R_3},$$

VTH3 is a threshold value of the voltage VDD when the control signal Ctrl2 inverts to a high level, namely, a threshold value of the voltage VDD when an internal power is set up,
VTH4 is a threshold value of the voltage VDD when the control signal Ctrl2 inverts to a low level, namely, a threshold value of the voltage VDD when the internal power powers down, wherein, VTH3 is greater than VTH4, and VTH1 is greater than VTH2, and VTH2 is greater than VTH4,
when the output signal of the second comparator is a high level, the second input end of the second comparator selects the input of the threshold value K×VTH4, and
when the output signal of the second comparator is a low level, the second input end of the second comparator selects the input of the threshold value K×VTH3.

18. The high voltage start-up circuit with adjustable start-up time of claim 11, wherein
the second comparator is configured to detect the voltage level of the power port VDD and generate a control signal Ctrl2,
the first comparator is configured to detect the voltage level of the power port VDD and generate the control signal Ctrl1,
the control signal Ctrl2 and the control signal Ctrl1 are selected to control the high voltage start-up circuit to work or stop working, thus causing a rise or a fall of the voltage VDD, thereby generating an inversion of the control signal Ctrl1 or the control signal Ctrl2,
during a power-on start-up stage, if the first initial enable signal is inactive, the control signal Ctrl1 controls the high voltage start-up circuit to work or not work,
if the first initial enable signal is active, the control signal Ctrl2 controls the high voltage start-up circuit to work or not work,
during a restart stage, if the first restart enable signal is inactive, the control signal Ctrl1 controls the high voltage start-up circuit to work or not work, and
if the first restart enable signal is active, the control signal Ctrl2 controls the high voltage start-up circuit to work or not work.

19. The high voltage start-up circuit with adjustable start-up time of claim 18, wherein the type and the number of the edges of the control signal Ctrl2, which are counted by the second counter, are configurable, for the power-on start-up, the number of the falling edges of the control signal Ctrl2 is configured to be N3, wherein N3 can be any positive integer, and when the chip restarts after an abnormal event, the number of the falling edges of the control signal Ctrl2 is configured to be N4, wherein N4 can be any positive integer.

20. A high voltage start-up circuit with adjustable start-up time, comprising:
a drain electrode of a first NMOS transistor connected with a first terminal of a first resistor, a gate electrode of a second NMOS transistor, and a negative terminal of a diode;
a source electrode of the first NMOS transistor, together with a positive terminal of the diode, connected to a power ground;
a drain electrode of the second NMOS transistor, together with a second terminal of the first resistor, connected with a port SW of a chip;
a source electrode of the second NMOS transistor, together with a first terminal of a second resistor, connected with a power port VDD of the chip, the power port VDD operable to generate a VDD voltage;
a second terminal of the second resistor connected with a first terminal of a third resistor and a first input end of a first comparator;
a second terminal of the third resistor connected to a power ground;
an output end of the first comparator connected with an input end of a first counter;
a first output end and a second output end of the first counter respectively configured to be connected with a PWM controller;
a first input end of a second comparator connected with the second terminal of the second resistor;
an output end of a one-of-two data selector is connected with a gate electrode of the first NMOS transistor;
an output end of the second comparator connected with a second input end of the one-of-two data selector and an input end of a second counter;
a first output end and a second output end of the second counter respectively configured to be connected with the PWM controller;
a first input end of the one-of-two data selector connected with the output end of the first comparator;
a selection terminal of the one-of-two data selector connected with an output end of an OR gate; and
a first input end and a second input end of the OR gate respectively connected with the first output end and the second output end of the first counter,
wherein
the first comparator is configured to detect a voltage level of the power port VDD of the chip and to generate a control signal Ctrl1, wherein the control signal Ctrl1 controls the high voltage start-up circuit to work or stop working, thus causing a rise or a fall of the VDD voltage, thereby generating an inversion of the control signal Ctrl1, wherein the type and the number of the edges of the control signal Ctrl1, which are counted by the first counter, are configurable, the first counter is configured to count a number of rising edges or falling edges of the control signal Ctrl1, and to generate a first initial start-up enable signal to regulate power-on start-up time of the chip and a first restart enable signal to regulate restart time of the chip, the second comparator is configured to detect the voltage level of the power port VDD and generate a control signal Ctrl2, the control signal Ctrl2 is an internal power signal or an indication signal of the internal power, the second counter is configured to count the number of rising edges or falling edges of the control signal Ctrl2 and to generate a second initial start-up enable signal and a second restart enable signal, a second input end of the first comparator is controlled by an output signal from the output end of the first comparator, and the second input end is configured to select either an input of a threshold value K×VTH1 or an input of a threshold value K×VTH2, wherein the input of the threshold value K×VTH1 and the input of a threshold value K×VTH2 are generated by the chip, and wherein the threshold value VTH2 is greater than a threshold value of the VDD voltage set for an internal power down event of the chip, ratio K is the voltage division ratio for the VDD voltage, which depends on a circuit structure constructed by the second resistor and the third resistor, wherein $$K = \frac{R_3}{R_2 + R_3},$$

VTH1 is a threshold value of the VDD voltage when the control signal Ctrl1 inverts to a high level, VTH2 is a threshold value of the VDD voltage when the control signal Ctrl1 inverts to a low level, wherein VTH1 is greater than VTH2, when the output signal of the first comparator is a high level, the second input end thereof selects the input of the threshold value K×VTH2, when the output signal of the first comparator is a low level, the second input end thereof selects the input of the threshold value K×VTH1, for the power-on start-up, the type and number of the edges of the control signal Ctrl1 are configured to be a falling edge and N1, wherein N1 can be any positive integer, and wherein for the restart, the type and number of the edges of the control signal Ctrl1 are configured to be a falling edge and N2, wherein N2 can be any positive integer, a second input end of the second comparator is controlled by an output signal from the output end of the second comparator and the second input end is configured to select either an input of a threshold value K×VTH3 or an input of a threshold value K×VTH4, wherein the input of the threshold value K×VTH3 and the input of a threshold value K×VTH4 are generated by the chip, ratio K is the voltage division ratio for the voltage VDD, which depends on a circuit structure constructed by the second resistor and the third resistor, wherein $$K = \frac{R_3}{R_2 + R_3},$$

VTH3 is a threshold value of the voltage VDD when the control signal Ctrl2 inverts to a high level, namely, a threshold value of the voltage VDD when an internal power is set up, VTH4 is a threshold value of the voltage VDD when the control signal Ctrl2 inverts to a low level, namely, a threshold value of the voltage VDD when the internal power powers down, wherein, VTH3 is greater than VTH4, and VTH1 is greater than VTH2, and VTH2 is greater than VTH4, when the output signal of the second comparator is a high level, the second input end of the second comparator selects the input of the threshold value K×VTH4, when the output signal of the second comparator is a low level, the second input end of the second comparator selects the input of the threshold value K×VTH3, the second comparator is configured to detect the voltage level of the power port VDD and generate a control signal Ctrl2, the first comparator is configured to detect the voltage level of the power port VDD and generate the control signal Ctrl1, the control signal Ctrl2 and the control signal Ctrl1 are selected to control the high voltage start-up circuit to work or stop working, thus causing a rise or a fall of the voltage VDD, thereby generating an inversion of the control signal Ctrl1 or the control signal Ctrl2, during a power-on start-up stage, if the first initial enable signal is inactive, the control signal Ctrl1 controls the high voltage start-up circuit to work or not work, if the first initial enable signal is active, the control signal Ctrl2 controls the high voltage start-up circuit to work or not work, during a restart stage, if the first restart enable signal is inactive, the control signal Ctrl1 controls the high voltage start-up circuit to work or not work, if the first restart enable signal is active, the control signal Ctrl2 controls the high voltage start-up circuit to work or not work, the type and the number of the edges of the control signal Ctrl2, which are counted by the second counter, are configurable, for the power-on start-up, the number of the falling edges of the control signal Ctrl2 is configured to be N3, wherein N3 can be any positive integer, and when the chip restarts after an abnormal event, the number of the falling edges of the control signal Ctrl2 is configured to be N4, wherein N4 can be any positive integer.

\* \* \* \* \*